UNITED STATES PATENT OFFICE.

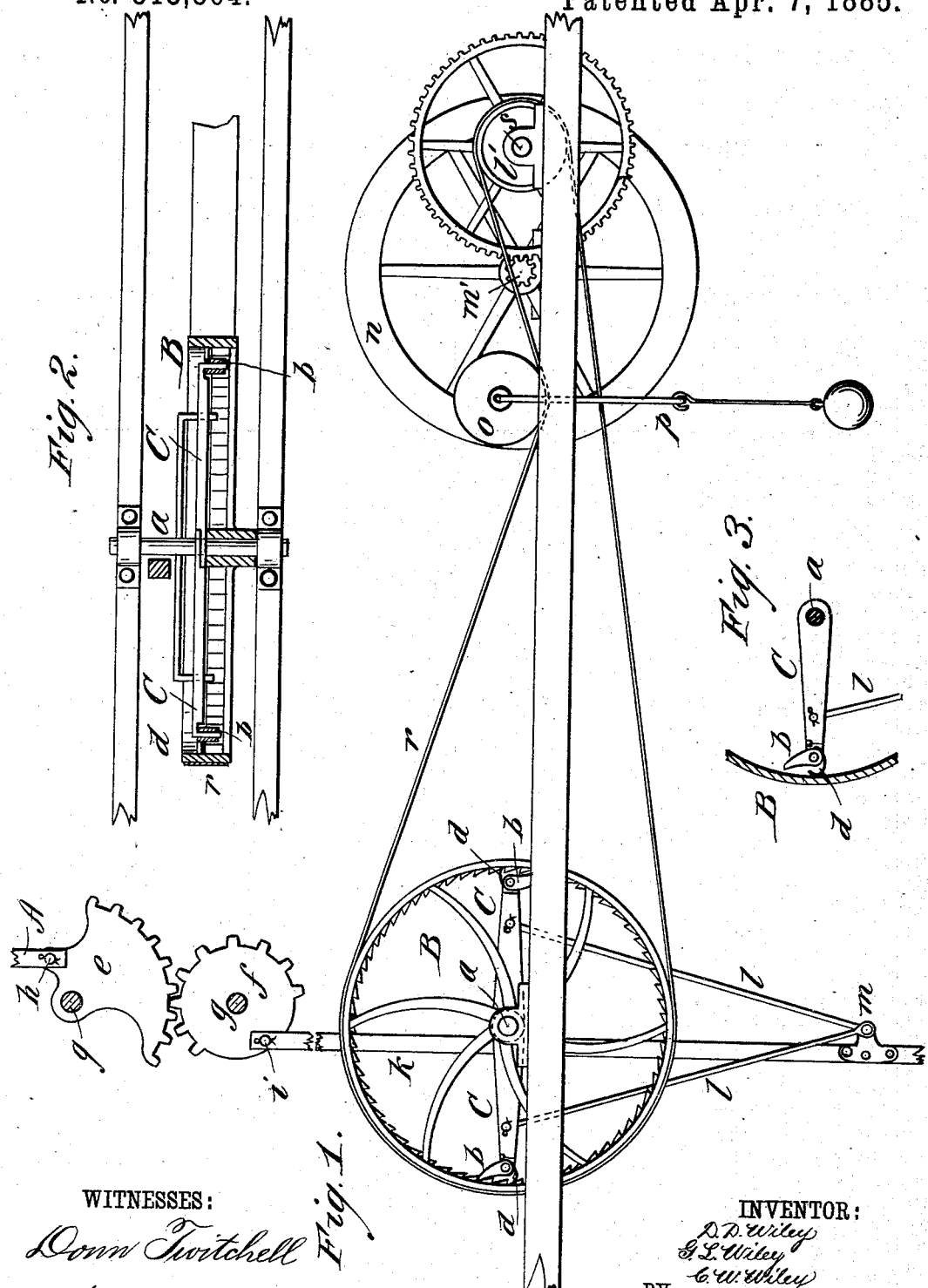

DANIEL D. WILEY, GEORGE L. WILEY, AND CHARLES W. WILEY, OF LANARK, ILLINOIS.

MECHANISM FOR CONVERTING MOTION.

SPECIFICATION forming part of Letters Patent No. 315,364, dated April 7, 1885.

Application filed September 26, 1884. (No model.)

*To all whom it may concern:*

Be it known that we, DANIEL D. WILEY, GEORGE L. WILEY, and CHARLES W. WILEY, all of Lanark, in the county of Carroll and State of Illinois, have invented a new and Improved Mechanism for Converting Motion, of which the following is a full, clear, and exact description.

Our improved mechanism is especially intended for use with windmills for converting the reciprocating motion of the pump-rod into rotary motion for operating churns, grindstones, hay and straw cutters, and other machines. The special object of the invention is to provide simple and effective mechanism for that purpose, and also to equalize the irregular speed and power of the windmill-rod, for which purposes we make use of the combination of devices hereinafter described and claimed.

Reference is to be had to the accompanying drawings, forming part of this specification, in which similar letters of reference indicate corresponding parts in all the figures.

Figure 1 is a side elevation, partly sectional, of the improved mechanism. Fig. 2 is a sectional plan view of the same; and Fig. 3 is a detail view.

A represents the reciprocating rod of a windmill, and B is a wheel on a shaft that is supported in bearings on a suitable frame adjacent to rod A. The wheel B is formed internally with ratchet-teeth of the width of about half its inner face, the rest of the face being smooth.

C C are arms loose on shaft $a$, and provided on their outer ends with pawls $b$ for engagement with the ratchet-teeth of the wheel.

$d$ are bent springs attached on pawls $b$, and bent so as to bear on the plain face of the wheel at the side of the ratchet-teeth, whereby when the arms C move in one direction the springs are compressed and force the pawls into engagement; but when the movement is reversed the springs are raised by their contact with the wheel and move the pawls back free from the teeth. This insures a noiseless movement.

$e$ and $f$ are two cogged segments pivoted on studs $g$, so as to gear together. The pump-rod A is connected by a crank-pin at $h$ to the larger segment $e$, and at $i$ on segment $f$ is connected a rod or slide, $k$, that is fitted for reciprocation in suitable guides. $l\ l$ are rods jointed to a boss, $m$, on slide $k$, and connected to the pawl-arms C. The relative arrangement of the connections $h\ i$ is such that when the rod A is at the extremes of movement, or at dead-centers, the slide $k$ is midway between its extremes, consequently the slide $k$ moves most rapidly at the time the rod A is moving slowly, and the irregular motion of the pump-rod A is thus equalized in its transfer to wheel B. By making the segment $e$ larger than segment $f$ the speed of the latter is increased, thereby giving two strokes of the slide to one of the pump-rod.

The operation is evident. The movement of slide $k$ causes the vibration of arms C, and these alternately engaging by their pawls with ratchet-wheel B cause intermittent rotary motion of the wheel.

The wheel B may be connected by belt directly with the machine to be driven, or, as shown, the belt $r$ may pass to a small pulley, $l'$, on a shaft, $s$, which is geared to a second shaft, $m'$, carrying a balance-wheel, $n$, so as to increase the speed and insure steady motion. On the belt is a tightener, $o$, balanced by a suspended stirrup, $p$, and weight.

The connecting-rods from the pawl-arms may go directly to the pump-rod A when the equalizer is not required.

Having thus described our invention, we claim as new and desire to secure by Letters Patent—

1. The combination, with the wheel B, provided on its interior with ratchet-teeth and a plain surface, of the arms C, pawls $b$, and the springs $d$, secured at one end to the pawls and bearing at the opposite end on the plain part of the wheel, as shown, whereby the action of the pawls will be noiseless in their backward movement, as described.

2. The equalizing-gear, consisting of the segments $f\ e$, connected, respectively, to the reciprocating rod A and slide $k$, combined with the said rod and slide and connections from the slide to a ratchet-wheel, substantially as described.

3. The combination of rod A, gearing $f\ e$, slide $k$, rods $l$, arms C, pawls $b$, and ratchet-wheel B, substantially as described, for operation, as specified.

DANIEL D. WILEY.
GEORGE L. WILEY.
CHARLES W. WILEY.

Witnesses:
J. L. WILSON,
D. W. DAME.